G. C. BROWN.
HEAVIER-THAN-AIR AIRSHIP.
APPLICATION FILED FEB. 27, 1918.
1,315,084. Patented Sept. 2, 1919.
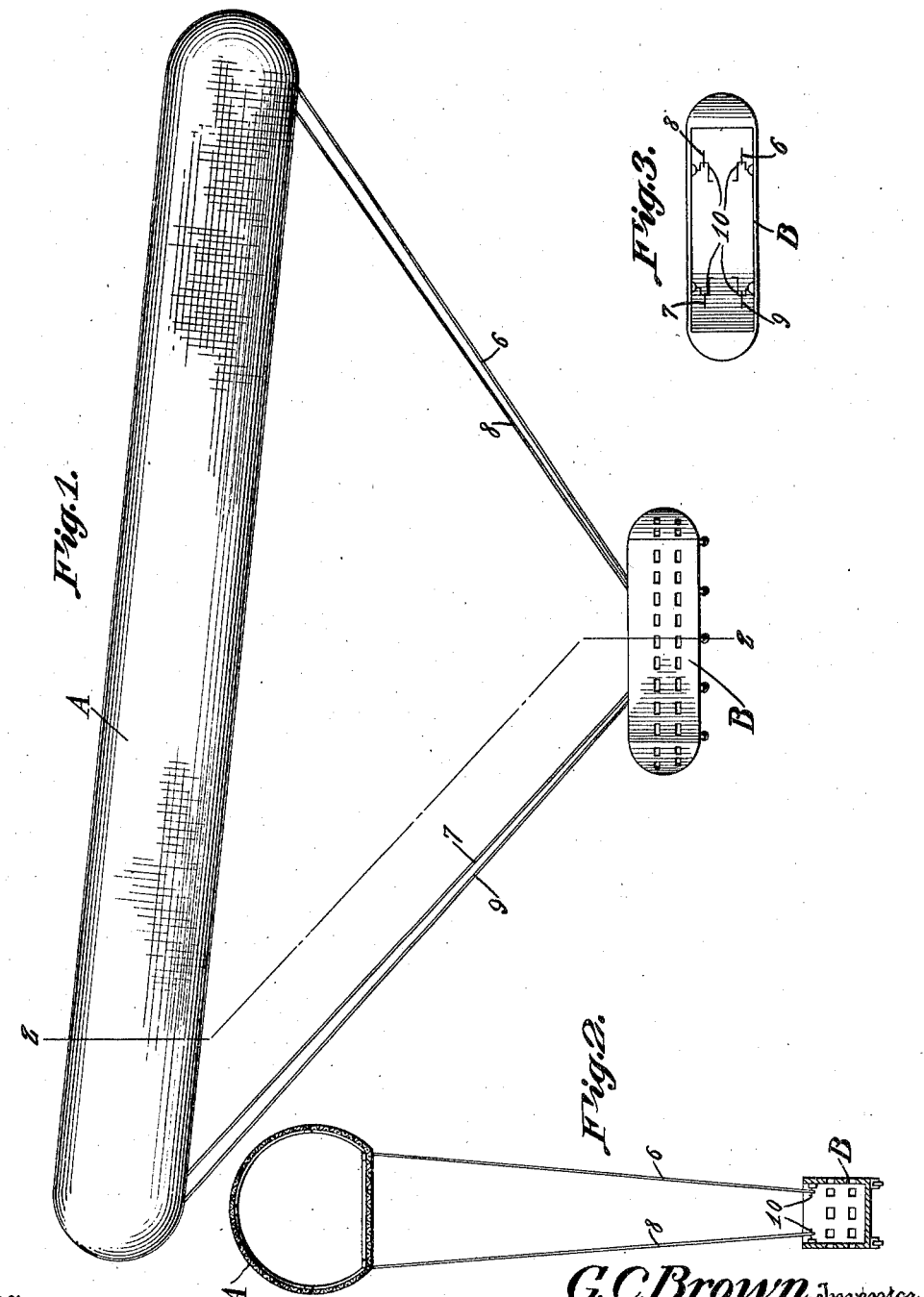
G. C. Brown, Inventor

UNITED STATES PATENT OFFICE.

GEORGE COLEMAN BROWN, OF DALLAS, TEXAS.

HEAVIER-THAN-AIR AIRSHIP.

1,315,084.  Specification of Letters Patent.  Patented Sept. 2, 1919.

Application filed February 27, 1918. Serial No. 219,466.

*To all whom it may concern:*

Be it known that I, GEORGE COLEMAN BROWN, a citizen of the United States, residing at Dallas, in the county of Dallas and State of Texas, have invented a new and useful Heavier-Than-Air Airship, of which the following is a specification.

My invention is a heavier-than-air airship and a method of operating, producing an airship which may be operated to ascend and descend and go forward, and to be turned in any desired direction. The invention consists in the combination of a hollow elongated plane, filled with gas, a car, and four cables, of which two are shorter than the other two, the parts being arranged so that they may be operated by a new method to fly upward and forward, and on a level and forward, and downward and forward, and be turned in any desired direction, as hereinafter specified.

The invention also consists of certain parts and details and combinations and methods of operation of the same, which will be hereinafter described and claimed.

Reference is to be had to the accompanying drawings forming a part of this specification, in which similar characters of reference indicate corresponding parts in the three views.

Figure 1 is a side view of the airship; and

Fig. 2 is a vertical section; and

Fig. 3 is a plan view of the car.

The hollow elongated plane A which is filled with gas, is placed above the car at an incline in relation to same, the front end being put lower than the rear end thereof, and the two shorter cables 6 and 8 are attached above to the lower front end of the plane, and the two longer cables 7 and 9 are attached above to the higher rear end of the plane, and the cables are extended inward and downward from the ends and sides of the plane at acute angles thereto, and are attached below to the operating cranks 10 on the car B, which with its equipment and load is heavier than the ascensive power of the gas with which the plane is charged.

The foregoing arrangements of the parts are all entirely new and I claim the same broadly but I shall state that thus far by my experiments and investigations that I have found that for the best results the length of the plane should be 5 or more times its breadth, that the plane should be placed at an incline of approximately 5 to 15 degrees, that the cables should be put inward from the ends of the plane at angles of approximately 45 degrees and inward from the sides at angles of approximately 5 degrees, and that the car should be attached to the cables at points apart where the cables converge to points equaling approximately $\frac{1}{5}$ to $\frac{1}{10}$ of the length of the plane, and that the plane be made with rounded or pointed ends to facilitate its going forward through the air and rounded upper surface to facilitate its rising when the cables are released and with a flat or arched nether surface so that it will press effectively against the air when pulled against the same, and wheels are attached to the bottom of the car to facilitate its ascending off ground and also to facilitate its alighting, and a suitable motor and apparatus is to be employed to operate the cables, but such motor and apparatus is separate and apart from this invention.

The airship thus constructed is operated to ascend and go forward through the air by first operating the cable 6, by turning the operating crank 10 to which it is attached, and then likewise operating the cable 7, and then the cable 8, and then the cable 9, with sufficient rapidity, and continuing to so operate them until the airship reaches the desired height, and then the airship is made to remain at the same height and to go forward by continuing to so operate the cables, with insufficient rapidity to cause it to ascend, but with sufficient rapidity to prevent it from descending.

The cables may also be operated in pairs, first the two front cables 6 and 8, both at one time, and then the two rear cables 7 and 9, both at one time, but better results are obtained by operating separately as per the foregoing as oscillation is prevented, and too the cables being put inward from the sides of the plane prevent oscillation.

The cranks 10, when operated, are turned a whole revolution pulling the plane against the air on the first half of the revolution and permitting it to ascend relative to the crank on the second half of the revolution so that it may rise to its position above the car. The airship is turned to the right by operating the two cables 6 and 7 with more rapidity than the two cables 8 and 9, and is turned to the left by operating the two cables 8 and 9 with more rapidity than the two cables 6 and 7.

When the cables are operated, the plane is pulled against the air which offers resistance by which the airship ascends and goes forward. The whole mode of operation as described is new. The operating of the cables is new and the alternating rotation in which the cables are operated is new.

The gas is employed to raise the plane to its position above the car after it is pulled against the air. Gas raising the plane causes the resistance which the air offers to it when it is pulled downward against the air to be all gain. If gas were not employed to raise the plane, and the plane were pushed to its position above the car after being pulled downward against the air, the resistance which the air would offer to the plane when it would be pushed would be exerted upon the car and would push the car downward the distance it was pulled upward, but by employing gas to raise the plane there is no reaction upon the car. Gas raising the plane produces the same result that would be produced were the plane to rise naturally.

Assume for instance that the plane were a flat boardlike plane and that no gas were used at all. When the flat boardlike plane would be pulled downward against the air, the air would offer resistance by which the car would be pulled upward and then the plane to be gotten to its position above the car would have to be pushed from the car, and when it would be pushed the resistance which the air would offer to it would be exerted upon the car and would push the car downward the distance it was pulled upward. Reaction equaling action, the airship would not ascend. If the board like plane would rise natually, there would be no reaction. Theoretically to produce such a board, make it hollow and charge it with gas or practically cover a frame with a gas proof fabric and charge it with gas.

The plane being elongated and being placed at an incline and the cables being put inward from the ends of the plane at acute angles and the alternating rotation in which the cables are operated, are the causes for the airship going forward. The plane being at an incline presses backward against the air at the same time it presses downward, and the plane being elongated and the cables being inward at acute angles to the plane cause the car to be pulled forward at the same time that it is pulled upward. When a front cable is operated, the car is pulled both upward and forward and when a rear cable is operated, the car is pulled upward and the plane is pulled forward. If the plane were not elongated and were all the cables operated at one time, the car would be pulled upward only; therefore, I have provided the elongation of the plane and the alternating rotation in producing forward flight. Too, the alternating rotation gives a smoothness of flight in the whole operation of the airship. So making the plane elongated and arranging the plane and the cables and the mode of operation to produce these effects are all new.

The car shown in the drawings should not be understood to mean that such cars are necessarily employed, and is here only used figuratively, but cars of any suitable shape with one or more compartments may be used as desired. Neither is it necessary, nor is it intended, that the elongated plane must necessarily be of the shape shown as elongated planes of many other different shapes can be employed with the same results but it is necessary that the plane be elongated, and for the best results the elongation should be at the ratio of 5, or more to 1.

Various changes in the form, proportions and minor details of my invention may be resorted to at will without departing from the spirit and scope thereof; hence I consider myself entitled to all such variations as may lie within the terms of my claim.

Having thus described my invention, I claim as new and desire to secure by Letters Patent:—

A heavier-than-air airship comprising a substantially cylindrical gas container having an elongated flat bottom face constituting a plane, the ends of the container being pointed and the width of said container being approximately one fifth the length thereof, a car below the container, said plane being inclined downwardly and forwardly, relative to the car, at an angle of from five to fifteen degrees, cables connecting the sides of the front portion of the plane to the sides of the front portion of the car, longer cables connecting the sides of the rear portion of the plane to the sides of the rear portion of the car, means for pulling successively upon one front cable, the diametrically opposed back cable, the other front cable and the other back cable thereby successively to raise the corners of the car relative to the plane, and for releasing said cables successively immediately after the pulling action, thereby to allow the corresponding portions of the plane to rise under the action of the gas, the forwardly and downwardly inclined plane acting, through such movement, to produce upward and forward flight.

In testimony that I claim the foregoing as my own, I have hereto affixed my signature.

GEORGE COLEMAN BROWN.